Nov. 14, 1933.    W. E. HUMPHREY    1,934,855
MACHINERY FOR MAKING HOLLOW RUBBER BALLS
Filed Dec. 10, 1932    3 Sheets-Sheet 1
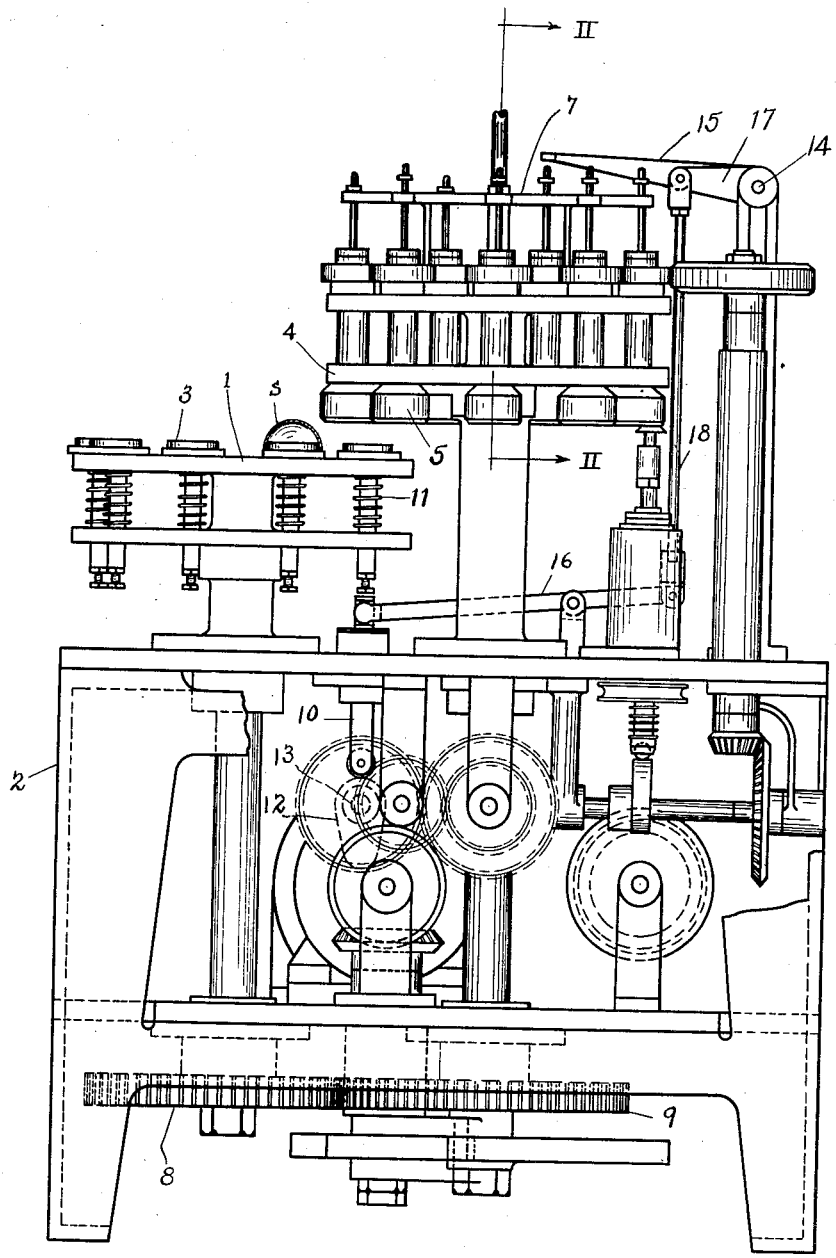
Fig. I
INVENTOR
Walter E. Humphrey
by Christy Christy and Wharton
his attorneys Nov. 14, 1933.   W. E. HUMPHREY   1,934,855
MACHINERY FOR MAKING HOLLOW RUBBER BALLS
Filed Dec. 10, 1932   3 Sheets-Sheet 2
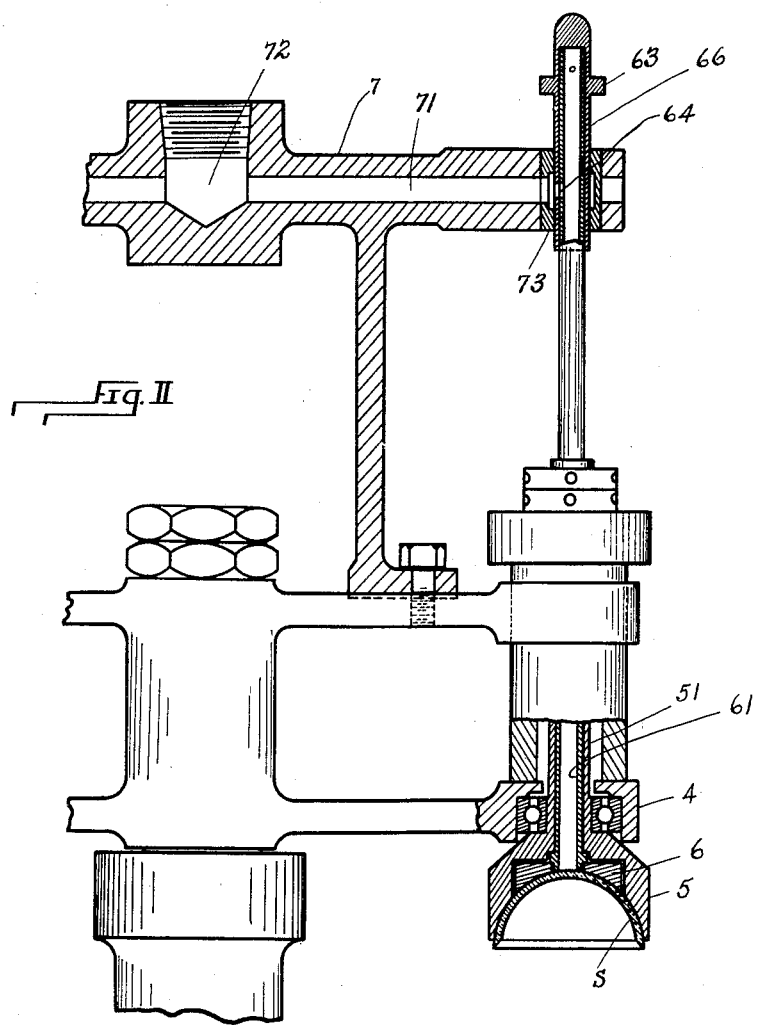
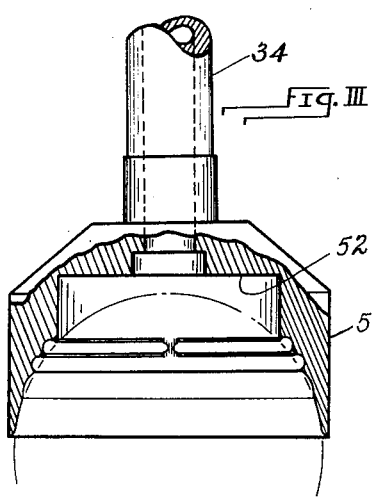
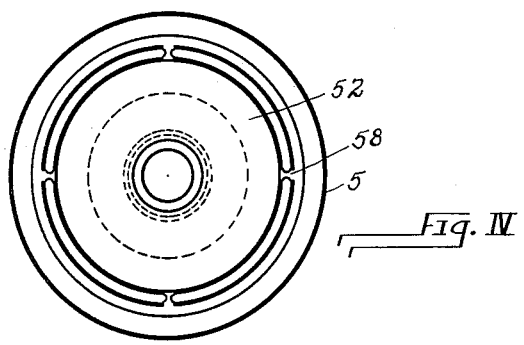

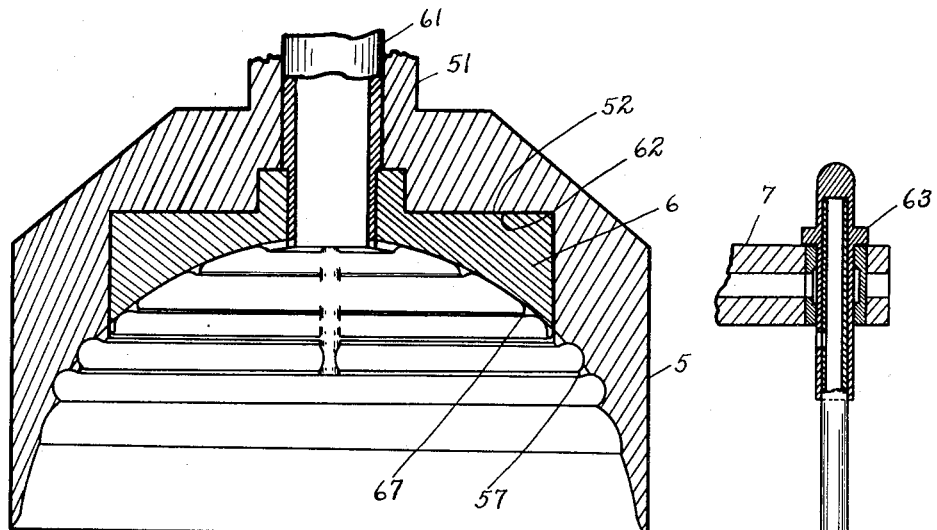
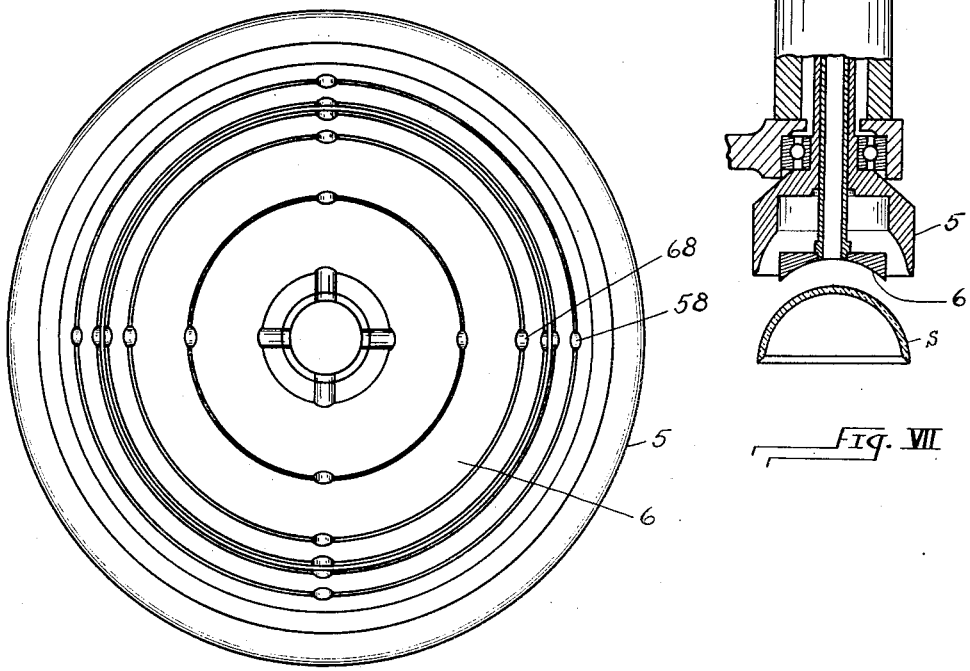

Patented Nov. 14, 1933

1,934,855

UNITED STATES PATENT OFFICE 1,934,855

MACHINERY FOR MAKING HOLLOW RUBBER BALLS

Walter E. Humphrey, Jeannette, Pa., assignor to Pennsylvania Rubber Company, a corporation of Pennsylvania Application December 10, 1932
Serial No. 646,659

6 Claims. (Cl. 18—2)

My invention relates to improvements in machinery for making hollow rubber balls, and finds practical application in machinery for making tennis balls. The machine of my invention is a machine of simple structure, easily maintained in condition, easily operated, and it affords accuracy and uniformity in its effect upon the articles dealt with. And that is a matter of no little importance in the production of an article so minutely standardized as is a tennis ball. Furthermore, the output is rapid, as the conditions of industry require. In Letters Patent of the United States, No. 1,801,085, granted on my application April 14, 1931, I have described a machine of the character indicated. My present invention is found in improvement upon such a machine, in consequence of which a certain source of possible inaccuracy is eliminated.

The machine embodying my present invention is illustrated in the accompanying drawings. Fig. I is a view of the machine in side elevation; Fig. II is a fragmentary view, partly in elevation, partly in vertical section, and drawn to larger scale, illustrating that detail in machine structure in which the present invention centers; Fig. III is a view to still larger scale, showing in side elevation and in axial section one segregated element of the assembly of Fig. II; Fig. IV is a view in plan from below of the element of Fig. III; Figs. V and VI are views to yet larger scale, corresponding to Figs. III and IV, but showing the assembly of another part or element with that of Figs. III and IV; Fig. VII is a view corresponding in other respects to Fig. II, but showing the movable parts or elements at the opposite limits of their ranges of reciprocatory movement.

In the production of tennis balls and other hollow rubber balls, hemispherical shells of raw rubber are pressed in molds, and, while still in the molds, are more or less completely cured. I say more or less completely cured. In the further course of manufacture, after their edges have been coated with vulcanizable cement, two such hemispherical shells are brought together edge to edge, and the assembly then is subjected to a further vulcanizing operation. That further vulcanizing operation is conducted in order to vulcanize the cement employed to unite the hemispheres in their edge-to-edge engagement. And it will be manifest that there is the possibility of so proceeding that the vulcanization that immediately follows the shaping of the shells in their molds shall be incomplete, and that the second vulcanization shall be a vulcanization, not of the cement only, but a further vulcanization (and a vulcanization to completion) of the partially vulcanized shells themselves. Ordinarily, however, the vulcanization of the shell substance is substantially completed in the first vulcanizing step, while the shell remains still in the mold in which it has been shaped.

In the molding of the hemispherical shells, good practice requires that the quantity of raw rubber placed in the mold shall slightly exceed that requisite in the molded article; and, in consequence, in the pressing operation a flash or fin is extruded between the edges of the meeting mold parts. This fin is developed along the outer equatorial edge of the hemispherical shell. In preparation for further manufacturing steps, the fin must be removed. Furthermore, the edges of the shells which are to meet, and which (by means of interposed cement or otherwise) are to be integrated, require further preparation by buffing, before the cement is applied and before the shells are brought together. The machine upon which this invention constitutes a refinement trims away the fins and buffs the edge surfaces of the hemispherical shells. That is to say, the machine is a machine for preparing molded ball-parts for union into completed balls.

It will be understood that, throughout this specification, the term rubber is used with the meaning that it has in common parlance. It is rubber, properly so called, but modified by having mixed with it other materials, designed to give to the finished article the physical properties that suit it precisely to its intended use.

Referring to Fig. I of the drawings, a movable and advantageously rotary carrier 1 is mounted in a suitable frame 2. This carrier is conveniently of turret form, circular in plan, rotatable on a vertical axis, and is equipped peripherally with a plurality of seats 3, upon which an attendant may place, concavity downward, one by one, the hemispherical shells of which the balls are to be made, as the shells come from the forming and vulcanizing molds. The turret 1 may be understood to be equipped with nine such seats 3. The particular number, however, is not material. The seats 3 are, in fact, the upper ends of plungers which protrude through openings in the horizontally extending plate which forms part of the turret and to which the numeral 1 is immediately applied. The plungers form with the plate 1 a single rotatable unit, but they are vertically reciprocable relatively to the plate, to achieve the ends in view.

A second movable and advantageously rotary carrier 4 is mounted in the frame 2. It also is of turret-like structure, and is rotatable upon a vertical axis. A horizontally extending plate that forms part of the turret structure, and to which the numeral 4 is immediately applied, is arranged to extend in a higher plane, but in a plane parallel to that in which the plate 1 extends, and the plate 4 overhangs the plate 1. Conveniently, the plate 4 also is circular and of equal size with the plate 1; and it too is provided peripherally with a plurality of seats 5, conveniently equal in number with those of plate 1. The overlap is sufficient and the proportions are such that the seats 3 with which plate 1 is equipped and the seats 5 with which plate 4 is equipped may come to vertical alignment. The seats 3 upon the plate 1 are adapted to receive the hemispherical blanks, concavity down, engaging their inner surfaces; the seats 5 are adapted to receive the blanks, while disposed in the same position with respect to the vertical, but to engage them upon their outer, upper surfaces.

The seats which, borne by the upper plate of the machine of my earlier patent alluded to, correspond to the seats 5 of the machine of my present invention are adapted to hold by friction the hemispherical shells introduced into them. The seats 5 of the machine of my present invention are adapted to hold by suction the hemispherical shells in position within them. These seats 5 are idly rotatable in the carrier 4, and reference to Fig. II will show them to be mounted upon and rotatable upon ball bearings, that their idle rotation may be as free as possible.

Coming now to a minute description of the seats 5, and with particular reference to Figs. II—VII, it will be perceived that the individual seat is composed of an outer element, to which the numeral 5 is immediately applied, and an inner element 6. The outer element 5 is immediately mounted in the plate 4, and has no other motion with respect to plate 4 than that of rotation on its vertical axis. The element 6, however, is mounted immediately upon element 5, and the mounting is such that element 6 is reciprocable vertically, within predetermined range, with respect to element 5. To such end, element 5 is provided with a vertically extending hollow stem 51 and element 6 is provided with a stem 61 (which also, for purposes presently to be described, is hollow), and this stem 61 is of such size as to fit snugly within the hollow stem 51 of element 5. The nether faces of the two elements 5 and 6 are shaped (with refinements presently to be explained) to the surface of a sphere, of diameter corresponding to the outer diameter of the shell to be seated. The upward movement of the element 6 is limited by abutment of meeting shoulders 52, 62, with the said spherical faces of the two parts extending in continuity—the position indicated in Figs. II and V. From such position the element 6 may move downward until a suitable stop 63 upon its stem comes to abutment upon the upper surface of a plate or spider 7 which forms part of the upper turret and is integral with the plate 4. Such lowered position of the element 6 is illustrated in Fig. VII.

The hollow stem 61, open at the lower end to the concavity of the lower face of element 6 and closed at the upper end, is provided laterally with a port 64, and the plate or spider 7 is provided interiorly with ducts 71 (one for each seat 5, branching from a common chamber 72) through which suction may be exerted. The arrangement is such that when the element 6 is in the lowered position (Fig. VII), the line through which suction may be exerted is interrupted, but as the rising element 6 approaches its elevated and blank-retaining position (Fig. II) the line of suction is made continuous. Refinements of structure in this particular include a sleeve 66 encircling and capping the upper end of stem 61, and a bushing 73 set in the plate or spider 7.

Minutely, the concave nether faces of elements 5 and 6 are preferably formed with circumferential grooves with ridges 57, 67 between, and with radial grooves 58, 68 intersecting such ridges, to the end that suction may be more readily and certainly effective, and that the somewhat elastic blanks may be the more securely held under pressure (the pressure of atmosphere) against such ridges. It is not necessary to make special provision that grooves 58 and 68 stand always in alignment; it suffices so to shape the elements at their line of meeting that when the element 6 is raised pneumatic communication shall be free between the two sets of grooves.

The two carrier plates 1 and 4 are caused to rotate oppositely and in unison, with pauses in the continuity of rotation; and the organization is such that, as two seats 3 and 5 come to vertical alignment, rotation shall be arrested for a predetermined interval. During the interval of such arrest, a hemispherical shell of rubber s, about to be operated upon, may be transferred from its seat in plate 1 to its aligned seat in plate 4; while, at the same time, from another seat in plate 4 another hemispherical shell, having been operated upon, may be discharged. Opposite rotation of the two plates in synchronism is effected by equipping their vertical shafts with interengaging gear wheels 8 and 9, of equal size; and the desired intermittance of rotation is effected by known means,—for example, by such means as are more fully shown in the earlier patent alluded to above.

A plunger 10 is mounted for vertical reciprocation in the frame 2, and is so situated that, when the rotating turrets come to rest, it is disposed beneath two vertically aligned seats 3 and 5. Explanation has been made that the seats 3 are, in fact, the upper ends of vertically reciprocable plungers. These plungers come to rest in alignment with plunger 10, and, while the carriers continue in condition of rest, the plunger 10 makes its reciprocation upward and down again. In its upward stroke, plunger 10 drives plunger 3, and the latter in its rise carries a rubber hemisphere in position upon it into the aligned seat 5 of the overhanging carrier. At the beginning of the rise of plunger 3 the vertically movable element 6 of the upper seat is in its downwardly extended position (the position shown in Fig. VII). Initial engagement of the ascending blank is accordingly made with the inner face of member 6. The blank is indeed pressed over a central area of its upper and outer surface against the concave nether face of element 6. And in the further advance of plunger 3 in its upward stroke, member 6 is driven upwardly, until it comes to the position shown in Fig. II—in which position the shoulder 62 abuts upon the shoulder 52 and the inner faces of the two elements 5 and 6 extend in a common spherical surface. As this position is approached, the port 64 in the stem 61 is uncovered, suction is exerted, and the suction becomes effective to secure the blank in the seat 5, 6. When the plunger descends again, suction is effective, both to hold the shell s to its place in seat 5, 6, and to hold the element 6 in the elevated position to which in the manner described it has been brought. Springs 11 are provided for effecting the return of the plungers 3, and with them plunger 10, to the lower limit of the range of reciprocation. The upward reciprocation of plunger 10, to accomplish the ends described, is effected in desired periodicity, and in organized synchronism with turret rotation, by means of a cam 12 mounted on a constantly rotating shaft 13. It is against the thrust of this cam that the springs 11 yield.

Understanding that the two turrets are equipped each with nine seats, and that they are simultaneously and intermittently rotatable, so that the seats come to vertical alignment, pair by pair, it is manifest that there are successive stations in the course of each complete rotation of the two turrets. At one such station transfer is effected, by the means which have been described, of a rubber hemisphere s from one of the seats 3 in plate 1 to one of the compound seats 5, 6 in plate 4. In the range of advance, while borne by the upper plate 4, the blank s may be subjected to the action of any desired instrumentalities: such, for example, as the means described in the letters patent first alluded to above, for trimming away flash and for buffing the edge. After these or other desired operations have been performed upon the blank, additional instrumentalities become effective, to discharge the blank from its position in the double seat 5, 6.

A shaft 14 rotatable in suitable bearings extends in horizontal position adjacent the upper turret; it is equipped with an arm 15 which, as the shaft rotates, will engage the capped upper end of the stem 61 of that seat which, carrying a hemispherical shell, has, after such operations as those indicated have been performed, come to the predetermined station where discharge is to be effected. The same cam 12 that effects the upward thrust of plunger 10 may effect the swinging of a lever 16 (jointed to plunger 10); and, the shaft 14 being equipped with an arm 17, the swinging of the lever 16 may, through a link 18, effect the rotation of shaft 14, and the desired swing of arm 15. Such downward swing of arm 15 drives the inner element 6 in its downward reciprocation until, the line of suction being cut off and the seated shell s being stripped from element 5, the element 6, now freely responsive to gravity, comes to its lowered position (Fig. VII). The hemispherical shell s meanwhile falls away, to a receptacle provided to receive it.

In operation, an attendant places the hemispheres as they come from the mold, concavity down, upon the seats 3, as in the rotation of carrier plate 1 the seats come successively to accessible position. Upon carrier plate 1 the seated hemispheres advance, until they come one by one to alignment beneath the seats in carrier plate 4. Thereupon the stem, whose upper end has constituted the seat 3 for the hemisphere, rises and, after engagement of the shell with the lowered element 6, carries shell and element 6 together upward, until at length the elements of the upper compound seat assume shell-retaining position, their nether faces being in spherical continuity, and the shell itself is in position in the seat so made effective. Meanwhile, suction has been exerted, and the elevated blank is by suction effectively retained in such upper seat. The stem 3 then descends, leaving the hemisphere so secured in the upper turret. Borne by the plate 3, the shell s advances, and as it advances it is subject to those operations (trimming and buffing, for example) that have been alluded to. It comes at length to rest at a station where, with a succeeding ascent of the plunger 10 for the transfer of a succeeding shell, the downward swing of arm 15 is effective to drive element 6 downward, and to release the duly prepared shell s and to allow it to fall away.

In the machine of the earlier patent first named above, the upper seat, borne by the carrier plate 3, receives and holds the rubber shell by friction. The provision so to hold the blank is effective, and the machine of that patent is successful. But there is one qualification. It sometimes happens (whether because of inexact positioning, or because of such change in the physical properties of the rubber as may occur if the shell is not a freshly made one, but has aged) that the shell is not in the operation of the machine accurately seated in the upper turret. And it is to remedy that occasional inaccuracy that this invention has been made. The upper seat of the earlier machine is proportioned to afford a snug fit for the shell, that the frictional hold may be effective. In the new machine there is tolerance: the concavity of the seat is slightly larger. The initial engagement of the shell with the upper seat is in the new machine upon a relatively small and central area; the peripheral parts of the shell continue free. Consequently, there is no tipping of the shell by pressure exerted unequally along the extent of its periphery. Finally the suction is, in consequence of the arrangement of the grooves within the seat, certainly immediately effective over medial areas of the extent of the shell. The shell thus is seated and securely held against accidental displacement.

I claim as my invention:

1. In rubber-ball making machinery the combination of a carrier, a seat for a ball part reciprocably borne by the carrier provided interiorly with a suction chamber, and the parts so arranged that, within the range of seat reciprocation, pneumatic communication between the suction chamber within the carrier and the seat is alternately established and cut off.

2. In rubber-ball making machinery the combination of a carrier provided interiorly with a suction chamber, and a seat for a ball part borne by said carrier and composed of a plurality of elements, one element of such seat being rotatable in its bearing and a second element of such seat being reciprocable in its bearing the parts being so arranged that within the range of reciprocation of said second element pneumatic communication between the suction chamber within the carrier and the seat is alternately established and cut off.

3. In rubber-ball making machinery the combination of a movable carrier of plate-like formation extending in horizontal plane, the said carrier being provided interiorly with a suction chamber, a seat for a hemispherical shell of rubber borne by said carrier and composed of an outer element rotatable in its bearing on a vertical axis and of an inner element reciprocable in vertical direction, the two said elements being provided with nether faces which when the inner element is raised extend in a continuous spherical surface, the parts so arranged that pneumatic communication between the suction chamber in the carrier and the seat, established when the inner element is in elevated position, is by the descent of the inner element cut off, means adapted to co-operate with said seat when the carrier is at one position in its range of movement and to raise a hemispherical shell of rubber to engagement with said seat and to raise the inner element of said seat to elevated position, and means adapted to co-operate with said seat when the carrier is at another position in its range of movement and to depress said inner member from its elevated position.

4. In rubber-ball making machinery the combination of a carrier provided interiorly with a suction chamber movable in horizontal plane, a downwardly concave seat borne by said carrier, such seat including a peripheral element and a central element, such central element being vertically reciprocable relatively to such peripheral element between an elevated position, in which the two elements stand in relative positions of seat-forming continuity, and a depressed position of discharge, the parts being so arranged that pneumatic communication between said suction chamber and said seat, established when the central element thereof is in elevated position, is by the downward reciprocation of said central element cut off, and means adapted to co-operate with such seat at a predetermined stage in the course of carrier movement and shift the central element thereof from its elevated position downwardly.

5. In rubber-ball making machinery the combination of a carrier, a compound hemispherical seat borne by said carrier, said seat consisting of an inner element having a face shaped to a segment of a sphere and an outer element movable relatively to the inner and having a face shaped to a zone of a sphere, the said seat being provided with a suction tube opening to the face of the inner element thereof, and the faces of both elements being grooved both radially and circumferentially with respect to the point of opening of such suction tube.

6. In rubber-ball making machinery the combination of a carrier, a seat for a ball part borne by said carrier, such seat having a work-engaging face of spherical contour, such seat being of compound structure and including an inner portion and an outer portion, the inner portion being movable relatively to the outer and adapted in its range of movement alternately to establish and to destroy the continuity of such spherical contour, the said inner portion being provided with a suction tube opening to the work-engaging face, and both portions of the said seat being provided upon their work-engaging face with grooves extending radially with respect to the point of opening of the said tube.

WALTER E. HUMPHREY.